United States Patent
Ahmad et al.

(10) Patent No.: US 10,859,679 B2
(45) Date of Patent: Dec. 8, 2020

(54) NOISE REDUCTION IN SAMPLE AND HOLD SYSTEMS

(71) Applicant: Melexis Technologies NV, Tessenderlo (BE)

(72) Inventors: Saad Ahmad, Waltham, MA (US); Volodymyr Seliuchenko, Nashua, NH (US); Sharath Patil, Ashland, MA (US); Darrell Livezey, Brookline, NH (US); Marcelo Mizuki, Nashua, NH (US)

(73) Assignee: Melexis Technologies NV, Tessenderlo (BE)

( * ) Notice: Subject to any disclaimer, the term of this patent is extended or adjusted under 35 U.S.C. 154(b) by 389 days.

(21) Appl. No.: 15/899,868

(22) Filed: Feb. 20, 2018

(65) Prior Publication Data

US 2018/0246191 A1    Aug. 30, 2018

(30) Foreign Application Priority Data

Feb. 24, 2017  (EP) .................................... 17157853

(51) Int. Cl.
| | |
|---|---|
| *G01S 7/4861* | (2020.01) |
| *H04N 5/365* | (2011.01) |
| *H04N 5/378* | (2011.01) |
| *G01S 7/487* | (2006.01) |
| *G01S 17/02* | (2020.01) |

(52) U.S. Cl.
CPC .......... *G01S 7/4861* (2013.01); *G01S 7/4876* (2013.01); *G01S 17/02* (2013.01); *H04N 5/3658* (2013.01); *H04N 5/378* (2013.01)

(58) Field of Classification Search
CPC ... G01S 7/4861; G01S 7/4876; H04N 5/3658; H04N 5/3653; H04N 5/378
See application file for complete search history.

(56) References Cited

U.S. PATENT DOCUMENTS

| | | | |
|---|---|---|---|
| 8,982,260 B2* | 3/2015 | Eshraghian | G11C 13/0007 348/308 |
| 9,066,030 B2* | 6/2015 | Kim | H04N 5/335 |

(Continued)

FOREIGN PATENT DOCUMENTS

WO    2014125371 A1    8/2014

OTHER PUBLICATIONS

European Search Report from EP Application No. 17157853.7, dated Jul. 11, 2017.

*Primary Examiner* — Eric L Bolda
(74) *Attorney, Agent, or Firm* — Workman Nydegger

(57) ABSTRACT

A sample and hold system, for capturing and reading a sequence of traces of an input signal. The sample and hold system comprising a readout device, a controller, and a sample and hold array of unit cells. The controller is configured for controlling the sample and hold system, such that during an acquisition phase a trace of samples is taken from the input signal in an original sample order and such that the samples are held in the unit cells wherein the samples are assigned to the unit cells in an acquisition order, such that during a consecutive readout phase the samples are read out from the unit cells wherein the order in which the unit cells are read out corresponds with a readout order, and such that the acquisition order and/or the readout order differs from trace to trace.

14 Claims, 2 Drawing Sheets

(56) References Cited

U.S. PATENT DOCUMENTS

| | | | |
|---|---|---|---|
| 9,237,286 B2* | 1/2016 | Theuwissen | H04N 5/3454 |
| 9,967,495 B2* | 5/2018 | Shin | H04N 5/3653 |
| 10,291,868 B2* | 5/2019 | Shin | H04N 5/3658 |
| 2006/0231732 A1 | 10/2006 | Yan | |
| 2009/0147089 A1* | 6/2009 | Tonkikh | H04N 5/3658 |
| | | | 348/207.99 |
| 2013/0228691 A1* | 9/2013 | Shah | G01S 17/89 |
| | | | 250/341.8 |
| 2019/0011543 A1* | 1/2019 | Gidel | G01S 7/4876 |

* cited by examiner

NOISE REDUCTION IN SAMPLE AND HOLD SYSTEMS

FIELD OF THE INVENTION

The invention relates to the field of sample and hold systems. More specifically it relates to a sample and hold systems wherein the fixed pattern noise can be reduced.

BACKGROUND OF THE INVENTION

In optical sensor applications, such as for example LIDAR applications, typically an analog input signal is sampled with an ADC and next the obtained trace is processed to find time of flight (or phase) and peak information. In applications where multiple optical sensors (e.g. pin diodes) are used it becomes impractical to have a high speed ADC for every optical sensor, due to die area cost and power reasons.

A more practical and cost effective method is to use a sample and hold array to sample the trace output and then multiplex the output to an ADC to process the traces.

In these optical sensor applications the noise is preferably as low as possible. The time dependent (temporal) noise may for example be reduced by averaging or other kind of low pass filtering of a series of traces. The time independent (or very low frequency) fixed pattern noise cannot be supressed by averaging technique. For LIDAR systems the decreased temporal and fixed pattern noise level may for example result in a longer range which can be monitored. Also for other applications a decreased noise level may be advantageous. There is therefore a need for decreasing the temporal noise and fixed pattern noise in sample and hold arrays.

SUMMARY OF THE INVENTION

It is an object of embodiments of the present invention to provide a good sample and hold system.

The above objective is accomplished by a method and device according to the present invention.

In a first aspect embodiments of the present invention relate to a sample and hold system, for capturing and reading a sequence of traces of an input signal. The sample and hold system comprises a readout device, a controller, and a sample and hold array of unit cells.

The controller is configured for controlling the sample and hold system, such that during an acquisition phase a trace of samples is taken from the input signal in an original sample order and such that the samples are held in the unit cells wherein samples are assigned to different unit cells according to an acquisition order, such that during a consecutive readout phase the samples are read out from the unit cells by the readout device wherein the order in which the unit cells are read out corresponds with a readout order, and such that the acquisition order and/or the readout order differs from trace to trace.

It is an advantage of embodiments of the present invention that fixed pattern noise (e.g. caused by offsets) related to a specific unit cell or to a specific readout sequence can be smeared out by altering the unit cell in which a sample is stored and/or by altering the readout sequence of the unit cells. This can be done by changing the acquisition order (i.e. which sample is assigned to which unit cell) and/or the readout order (i.e. the order in which the unit cells are read out) from trace to trace. In a later stage the read out samples for the different traces can be processed (e.g. by averaging or by accumulating). As the fixed pattern noise is smeared out this will result in a reduced overall noise.

In embodiments of the present invention at least part of the readout order and/or part of the acquisition order is a predefined order.

It is an advantage of embodiments of the present invention that it is possible to define the acquisition order and/or the readout order for different traces. This allows to compensate for specific defects in a specific array of unit cells which may for example be configured in a specific way. The array of unit cells may for example be a 1D array of unit cells or a 2D array of unit cells.

In embodiments of the present invention at least part of the readout order and/or part of the acquisition order is a random order.

It is an advantage of embodiments of the present invention that any fixed pattern noise which is related to a specific location of a unit cell or to a specific readout sequence can be smeared out by assigning a random order to the readout order or to the acquisition order.

In embodiments of the present invention the controller is configured such that a first unit cell of the readout order and/or a first unit cell of the acquisition order is a random unit cell and such that the following unit cells in the readout order and/or in the acquisition order are consecutive unit cells in the array of unit cells.

It is an advantage of embodiments of the present invention that the acquisition order and/or the readout order can be made random by randomly changing the first unit cell in the acquisition order and/or in the readout order. The following unit cells in the readout order and/or in the acquisition order are consecutive unit cells in the array of unit cells (e.g. using an incrementing address pointer). Consecutive unit cells are unit cells with consecutive addresses. Consecutive unit cells may be physically neighbouring cells. However, this is not necessarily the case. They can for example be on a different row in a 2D array.

In embodiments of the present invention the controller is configured such that the acquisition order and/or the readout order are grouped into subgroups. In embodiments of the present invention the order in which subgroups are sampled or readout differs from trace to trace and/or the order wherein the unit cells within a subgroup are readout or sampled differs from trace to trace. In embodiments of the present invention the first unit cell of a subgroup may for example be a random unit cell and the following unit cells may be consecutive unit cells in the array of unit cells.

It is an advantage of embodiments of the present invention that the acquisition order and/or to the readout order can be subdivided in subgroups. This can for example be matched with a specific physical organisation of the unit cells.

In embodiments of the present invention the unit cells are grouped into segments and each subgroup of the acquisition order and/or of the readout order corresponds with a segment.

In embodiments of the present invention the controller is configured such that the random assignment is based on a pseudo random binary sequence.

In embodiments of the present invention the readout order is the same as the acquisition order.

It is an advantage of embodiments of the present invention that no reordering of the readout samples is required to follow the original sample order. By reading the unit cells out in the same sequence as they are written the same sample order can be obtained.

In embodiments of the present invention the sample and hold system comprises a decoder wherein the decoder is configured for reordering the readout samples in the original sample order taking into account the acquisition order and the readout order.

It is an advantage of embodiments of the present invention that the readout samples can be reorganized in the original sample order. This allows for example to average the corresponding samples of different traces. In embodiments of the present invention the decoder may be implemented as software code running on a microprocessor or any other controller.

In embodiments of the present invention each unit cell comprises a capacitor and the capacitors are configured for holding the samples.

In embodiments of the present invention each unit cell comprises a magnetic element and the magnetic elements are configured for holding the samples.

In embodiments of the present invention the system is configured for averaging or accumulating corresponding samples of different traces, wherein a sample of a first trace is corresponding with a sample of a further trace when both samples are at the same position in the original sample order. The original sample order thereby corresponds with the order in which the input signal is sampled. Corresponding samples of one trace and a further trace are for example: the first sample of one trace and the first sample of a further trace, the second sample of one trace and the second sample of a further trace, and so on.

It is an advantage of embodiments of the present invention that fixed pattern noise (e.g. an offset related to a specific unit cell) related to a specific unit cell or to a specific readout sequence is reduced by altering the unit cells wherein corresponding samples are held and by averaging or accumulating the samples read out by the readout device. Altering the unit cells wherein corresponding samples are held may be done by assigning corresponding samples to different unit cells. This is controlled by the controller. It is an advantage of embodiments of the present invention that the impact of fixed pattern noise (for example caused by device mismatches) in the sample and hold block architecture can be averaged out. It is an advantage of embodiments of the present invention that the fixed pattern noise arising from the physical limits of the array of unit cells, from the design constraints, and from the process mismatches can be reduced. By increasing the number of traces and the number of different unit cells to which corresponding samples are assigned, the impact of overall averaging can be increased and thus the relative fixed pattern noise contribution can be decreased. This is for example advantageous in LIDAR systems as it allows to increase the range and resolution of the system. Different input signals may be captured and read by the sample and hold system. These may for example be generated by different channels. It is thereby an advantage of embodiments of the present invention that it is not required to have a readout device for every channel. In embodiments of the present invention the controller is configured for multiplexing the samples in the unit cells to the readout device. It is an advantage of embodiments of the present invention that any systematic error related to a specific unit cell can be averaged out by randomly assigning the samples to different unit cells.

In embodiments of the present invention the number of traces that is captured is configurable. It is an advantage of embodiments of the present invention that the number of traces is configurable. This allows to reduce the noise depending on the measurement requirements or to reduce the acquisition time if the signal to noise requirements are less stringent.

In embodiments of the present invention the array of unit cells is a two dimensional array of unit cells.

It is an advantage of embodiments of the present invention that a compact sample and hold array can be generated. This can be done by creating a two dimensional array of unit cells and by organising the unit cells into rows and columns. It is an advantage of embodiments of the present invention that fixed pattern noise related to a specific unit cell because of the two dimensional configuration of the unit cells can be spread out by altering the acquisition order and/or the readout order.

In a second aspect embodiments of the present invention relate to an optical detector, the optical detector comprising a sample and hold system according to any of the previous claims and an array of optical sensors, each optical sensor comprising an input for detecting an optical signal and an output for generating an output signal which is representative for the detected optical signal, wherein the outputs of the optical sensors are the input signals of the sample and hold system.

It is an advantage of embodiments of the present invention that the optical detector comprises a plurality of optical sensors which all can be connected to the sample and hold system. The array of optical sensors may be a 1D or even a 2D array. Using a sample and hold system according to embodiments of the present invention, the fixed pattern noise can be reduced by randomisation of the samples and averaging the corresponding samples. Such an optical detector may for example be used as part of a LIDAR (light detection and ranging) system. In that case a pulsed laser is periodically send out and this sequence of pulses is sampled by the sample and hold system resulting in a plurality of traces which are captured and readout by the sample and hold system. It is an advantage of embodiments of the present invention that by reducing the noise in the obtained digitized system it is possible to extend the range of the LIDAR system.

In a third aspect embodiments of the present invention relate to a method for capturing and reading a sequence of traces of an input signal the method comprises capturing and reading out at least two traces of the input signal by at least two cycles of:—an acquisition phase wherein samples are taken from the input signal and held in a unit cell of a sample and hold array of unit cells wherein the samples are assigned to the unit cells in an acquisition order; a readout phase wherein the samples in the unit cells are read out by a readout device wherein the order in which the unit cells are read out corresponds with a readout order, wherein the acquisition order and/or the readout order differs from trace to trace.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
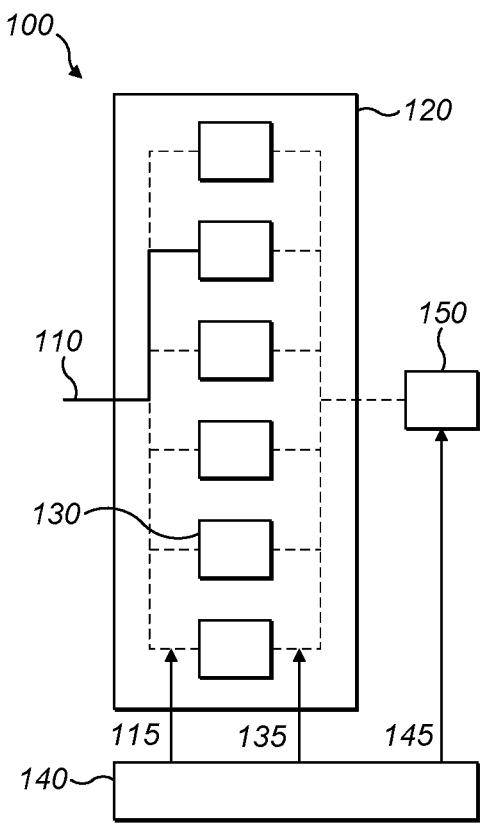
FIG. 1 schematically shows a sample and hold system in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a sample and hold system, reference is made to a system wherein during the acquisition phase the input signal is sampled and stored in unit cells (e.g. in a capacitor in each of the unit cells), and wherein during a readout phase the sample is read out by the readout device.

In a first aspect embodiments of the present invention relate to a sample and hold system 100, for capturing and reading a sequence of traces of at least one input signal. The sample and hold system 100 comprises a sample and hold array 120 of unit cells 130. Each unit cell may comprise a capacitor wherein a sample can be held (i.e. wherein a charge can be stored which is indicative for the size of the sampled signal). In other embodiments of the present invention each unit cell may comprise a magnetic element for holding the samples. Such a magnetic element may for example be a memristor. The sample and hold system comprises a controller 140. The sample and hold system comprises a readout device 150 for reading out the sampled signals. The readout device may for example comprise an analogue to digital converter (ADC) for digitalisation of the sampled signals. The readout device may further comprise an operational amplifier connected with its input to the sample and hold array and with its output to the ADC.

The controller 140 is configured for controlling the sample and hold system 100. This may be done by controlling access switches connected to the unit cells. Thereby two phases can be distinguished. During an acquisition phase a trace of samples is taken from the input signal 110 and held in the unit cells 130. During a readout phase the samples held in the unit cells 130 are read out by the readout device 150. The samples may for example be digitized by an ADC. In that case the unit cells 130 may be connected one by one to the ADC. The readout device may comprise components for analogue processing and amplification the signals coming from the unit cells before passing them to the ADC.

The controller 140 is configured for controlling the sample and hold system 100 such that a plurality of traces is captured and readout. The trace of samples which is taken from the incoming signal has a sample order which is the original sample order. Each captured trace comprises a number of samples and a sample of a first trace is corresponding with a sample of a further trace when both samples have the same sample number (both are on the same position within the original sample order).

The controller 140 is configured for controlling the sample and hold system 100 such that the samples are held in the unit cells and such that the assignment of samples to a unit cell is done according to a certain acquisition order.

This acquisition order defines for each of the samples in which unit cell it should be held.

Similarly the controller 140 is configured for controlling the sample and hold system such that during a readout phase (following an acquisition phase) the samples are read out from the unit cells wherein the order in which the unit cells are read out corresponds with a readout order.

The controller 140 is configured such that the acquisition order and/or the readout order differs from trace to trace.

An acquisition order may for example be: unit cell 5, unit cell 3, . . . unit cell x. Meaning that the first sample is stored in unit cell 5, the second sample is stored in unit cell 3, and the last sample of the trace is stored in unit cell x. The sample numbering thereby corresponds with the original sample order (i.e. the order in which the trace is sampled).

A readout order may for example be: unit cell 5, unit cell 3, . . . unit cell x. Meaning that the unit cell 5 is readout first, unit cell 3 is readout second, and unit cell x is readout last.

In embodiments of the present invention at least part of the readout order and/or acquisition order is a predefined order.

In embodiments of the present invention at least part of the readout order and/or acquisition order is a random order. This random order may for example be obtained by a pseudo random binary sequence. The invention is, however, not limited thereto. The random order may be generated by the controller, it may be stored in the controller, and/or it may be retrieved by the controller. Random sequences or any other types of sequences may be retrieved by the controller from a ROM or RAM memory. They may for example be stored in a lookup table with preloaded sequences. They may be externally generated and stored in the ROM or RAM memory.

In embodiments of the present invention the sample and hold system may comprise a digital circuit configured for generating specific pseudo random orders based on a selected digital seed value. This digital seed value may for example be generated by the controller.

Assigning a sample to a unit cell during the acquisition phase may for example be done as follows. Addressing of a specific sample to a unit cell may be done randomly or according to a specific order. The unit cell where a sample is stored may also be changed between traces by changing the first unit cell for each new trace. In embodiments of the present invention the controller 140 is configured for controlling the timing in such a way that for every trace accumulation the first sample is held on a different unit cell 130. This allocation of the unit cells to a certain sample may be programmable. In that case the first unit cell of the acquisition order is a random unit cell.

In another embodiment, in case the sample and hold system is used in an application where a source pulse (e.g. a LED or a LASER pulse) should be detected, acquisition phase randomization may be done by introducing a random delay of the source pulse instead of changing the addressing for every acquisition. In this case the signal is sequentially sampled during the acquisition phase; during the readout phase a number of the first samples, corresponding to the used source pulse delay, is skipped.

After capturing a trace, the samples are read out from the unit cells 130 by connecting the unit cells with the readout device 150. The order in which the unit cells are read out corresponds to the readout order which can be varied from trace to trace.

Such a sample and hold system is schematically illustrated in FIG. 1. FIG. 1 shows an input signal 110, which is sampled in a sample and hold array 120 of unit cells 130 (the dashed lines indicate possible connections between the input signal 110 and the unit cells 130. The fixed line between the input signal 110 and a unit cell 130 illustrates the sampling and holding of a sample of the input signal into a unit cell 130. This addressing is controlled by the controller 140, and indicated by the arrow 115, and is done in a certain acquisition order. The controller 140 also controls the readout of the unit cells 130, shown with the arrow 135, by the readout device 150 (e.g. comprising an ADC). Also this addressing is controlled by the controller 140 and is done in a certain readout order. The operation of the readout device 150 is also controlled by the controller 140, shown with the arrow 145.

In embodiments of the present invention the sample and hold array may be subdivided in segments of unit cells. The acquisition order and/or the readout order may be subdivided into subgroups. Each subgroup may thereby correspond with a segment. A segment may for example be a row in a 2D sample and hold array of unit cells.

In embodiments of the present invention the sample and hold array is a 2D array of unit cells. It is an advantage of embodiments of the present invention that fixed pattern noise (e.g. caused by measurement offsets) which is inherent to the nature of the (2D) sample and hold array of unit cells, caused by the different rows, the parasitics, the device mismatches, or the different switches, can be reduced. This can be done by taking multiple acquisitions of the same trace such that the acquisition order and/or the readout order differs from trace to trace. In case of a 2D array the acquired samples may be assigned to unit cells from the same row or even from the whole array.

In embodiments of the present invention the read out digitized samples are averaged or summed or low pass filtered by other means. Thereby the contribution of the fixed pattern noise (as well as the temporal noise) is reduced because the acquisition order and/or the readout order differs from trace to trace. If, for example, 80 averages are done in an array comprising 80 unit cells, and if the corresponding samples in the different traces are held on each unit cell in the array of 80 unit cells 130 then a specific offset from a physical capacitor can be reduced by a factor of 80 and noise by a factor sqrt(80), because every sample will be impacted equally by the physical mismatch, and timing variations arising from every unit cell location.

In embodiments of the present invention each unit cell may comprise a capacitor for storing the sample. The unit cell moreover may comprise switches on each side of the capacitor which allow isolating the capacitor. This has as advantage that a charge can be stored in a capacitor for at least e.g. 10 µs without significant degradation.

In embodiments of the present invention the samples are written in the sample and hold array of unit cells in a sequential matter. This is controlled by the controller 140. For example if, in a 2D sample and hold array 120 of unit cells 130, a sample is written to a unit cell <ROW0,COL0>, then the next sample is written to the consecutive unit cell <ROW0,COL1>.

Assuming a 2D sample and hold array of unit cells, the allocation scheme controlled by the controller 140 may be as follows:

Acquisition 1=Sampling start at unit cell #1 in row 1
Acquisition 2=Sampling start at unit cell #2 in row 1
. . .
Acquisition 12=Sampling start at unit cell #12 in row 1.
Acquisition 13=Sampling start at unit cell #1 in row 2
Acquisition 14=Sampling start at unit cell #2 in row 2
. . .
Acquisition 24=starting unit cell #12 in row 2.
. . . so on If the corresponding digitized samples of the different traces are averaged, the row offsets related to specific unit cells 130 (e.g. the row transition offsets) are smeared over all the samples in that row. Hence the impact of the offset as compared to the normal mode (without assigning corresponding samples to different unit cells) has in this specific example been reduced by a factor of sqrt(12).

However, for a sample and hold array 120 of unit cells 130 where the controller 140 is configured for assigning any sample to any unit cell in the array in any order, the fixed pattern noise (e.g. caused by an offset) related to specific unit cells 130 may be reduced even more. In that case the acquisition order is a random order.

It is an advantage of embodiments of the present invention that fixed pattern noise arising from a sample and hold blocks physical limits, design constraints and process mismatches can be reduced. This fixed pattern noise may be caused by any offsets arising from the sample and hold scheme implementation (both in a 1D configuration of unit cells and in a 2D configuration of unit cells). The 1D and 2D nature of the array means that every different unit cell and the circuitry around it can have mismatches which will result in different fixed pattern noise (e.g. caused by an offset) per location. It is an advantage of embodiments of the present invention by changing the acquisition order and/or the readout order from trace to trace limitations of the sample and hold array can be decreased by a programmable factor (e.g. by programming the number of traces which are captured and the number of digitized samples which are averaged). In prior art systems, for every trace capture the same sample is held in the same physical capacitor. Hence systematic faults related to a specific capacitor cannot be cancelled out. It is therefore an advantage of embodiments of the present invention that an improved signal to noise ratio can be obtained and the FPN (fixed pattern noise) reduced.

Figure 2:
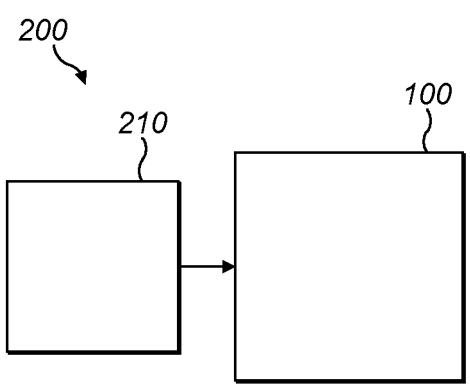
FIG. 2 shows an optical detector 200 in accordance with embodiments of the present invention.

In a second aspect embodiments of the present invention relate to an optical detector 200. The optical detector comprises a sample and hold system 100 in accordance with embodiments of the present invention. The optical detector moreover comprises at least one optical sensor 210. This may for example be an array 210 of optical sensors. Each of these optical sensors comprises an input for detecting an optical signal and an output for generating an output signal which is representative for the detected optical signal. An example of such an optical sensor could be a PIN diode with a transimpedance amplifier. The optical detector 200 is configured such that the outputs of the optical sensors are the input signals of the sample and hold system 100. An example of such an optical detector 200 in accordance with embodiments of the present invention is schematically drawn in FIG. 2.

Sample and hold systems 100 according to embodiments of the present invention may for example be used in the time domain. In such applications the sample and hold system may be used to acquire traces which can then be processed to detect objects. Such applications may be looking for pulses in the time domain trace. It is thereby an advantage of embodiments of the present invention that the output of the sample and hold system 100 does not comprise any fixed pattern noise which is greater than the noise floor of the system. In sample and hold systems wherein the acquisition order and/or the readout order does not differ from trace to trace, fixed pattern noise may arise on specific samples and this may occur even after averaging. This may for example be caused by the fact that one unit cell is manufactured a little different from another unit cell, it also might be caused by the architecture of the sample and hold block. It is an advantage that the fixed pattern noise can be reduced by sample and hold systems in accordance with embodiments of the present invention. By changing the acquisition order and/or the readout order the fixed pattern noise can be smeared out over multiple samples. By e.g. averaging the read out samples there impact may be reduced.

In embodiments of the present invention each of these traces acquired by the sample and hold system may correspond with a period of a periodic incoming signal 110. The incoming signal may for example be a sequence of pulses. For each trace such a pulse may be sampled. The sampling of the incoming signal 110 may thereby be done synchronous with the incoming signal. During acquisition samples are held in the unit cells. The order in which the unit cells are accessed is the acquisition order. The order in which the unit cells are read out is the readout order. Between different traces the acquisition order and/or the readout order is differing.

Embodiments of the present invention may also relate to a LIDAR system. Such a LIDAR system comprises an optical detector in accordance with embodiments of the present invention and a transmitter. The transmitting part may thereby be adapted for transmitting a periodic signal. The sample and hold system is adapted for capturing traces (the received echo signals) of this periodic signal. A trace may thereby correspond with one or more periods of the periodic signal.

In applications like LIDAR the array of optical structures is used as the sensor to detect reflected laser/led pulses. Normally these pulses are acquired multiple times and then averaged to improve SNR. In a system on chip implementation it is not practical to have an ADC for every channel. Therefore, in embodiments of the present invention, the sample and hold array 120 of unit cells 130 is inserted to capture the trace for every channel and then during readout phase connect these arrays to the readout device 150 by multiplexing. The array 120 of unit cells 130 can be both one dimensional or two dimensional. The two-dimensional array of unit cells may for example exist of a plurality of one dimensional sample and hold arrays of unit cells, with for each channel a different one dimensional array of unit cells.

Any application wherein signals are acquired and averaged by a sample and hold system and which have benefit from a reduced fixed pattern noise level, have benefit from using a sample and hold system in accordance with embodiments of the present invention.

Figure 3A:
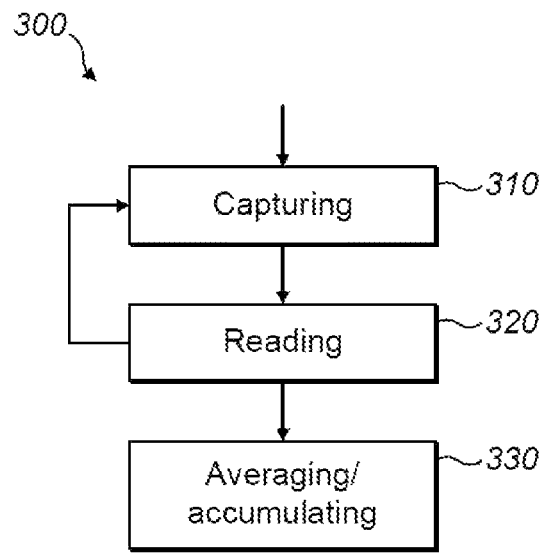
FIG. 3A shows a flow chart of a method in accordance with embodiments of the present invention.

In a third aspect embodiments of the present invention relate to a method 300 for capturing and reading a sequence of traces of an input signal 110. An exemplary flow chart of such a method is illustrated in FIG. 3A. The method comprises capturing and reading out at least two traces of the input signal by at least two cycles. Each cycle comprises a capturing phase 310 wherein samples are taken from the input signal and held in a unit cell of a sample and hold array of unit cells wherein the samples are assigned to different unit cells according to the acquisition order. Each cycle moreover comprises a readout phase 320 wherein the samples in the unit cells are read out by a readout device wherein the order in which the unit cells are read out corresponds with a readout order. The acquisition order and/or the readout order differs from trace to trace.

In embodiments of the present invention the method comprises an averaging phase 330 wherein the corresponding samples of consecutive traces are averaged or accumulated.

Figure 3B:
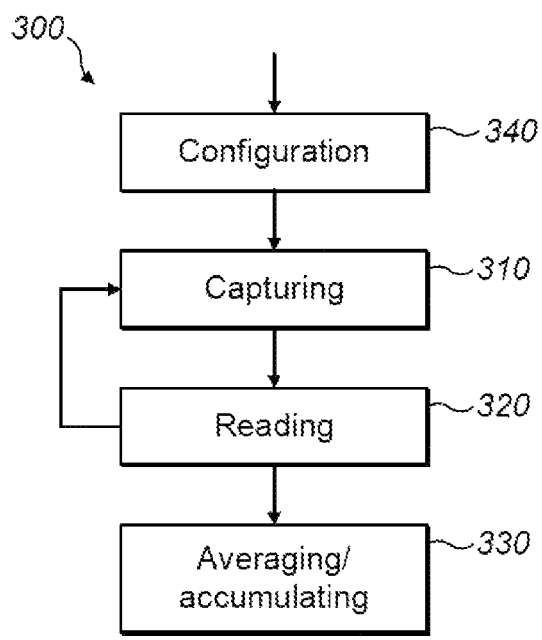
FIG. 3B shows a flow chart of a method in accordance with another embodiment of the present invention.

Methods according to embodiments of the present invention moreover may further comprise a configuration phase 340, as illustrated in FIG. 3B, wherein the number of traces that will be captured and the number of digitized samples that will be averaged or accumulated can be configured.

The invention claimed is:

1. A sample and hold system, for capturing and reading a sequence of time domain traces of an input signal, the sample and hold system comprising:
    a readout device,
    a controller, and
    a sample and hold array of unit cells,
    wherein the controller is configured to control the sample and hold system
        such that during an acquisition phase a trace of samples is taken from the input signal in an original sample order and such that the samples are held in the unit cells wherein samples are assigned to different unit cells according to an acquisition order, and
        such that during a consecutive readout phase the samples are read out from the unit cells by the readout device wherein the order in which the unit cells are read out corresponds with a readout order,
    wherein the acquisition order and/or the readout order differs from trace to trace, and
    wherein the sample and hold system is configured to average or accumulate corresponding samples of the sequence of traces, wherein a sample of a first trace corresponds with a sample of a further trace when both samples are at the same position in the original sample order.

2. The sample and hold system according to claim 1, wherein at least part of the readout order and/or part of the acquisition order is a predefined order.

3. The sample and hold system according to claim 1, wherein at least part of the readout order and/or part of the acquisition order is a random order.

4. The sample and hold system according to claim 1, wherein the controller is configured such that a first unit cell of the readout order and/or a first unit cell of the acquisition order is a random unit cell and such that the following unit cells in the readout order and/or in the acquisition order are consecutive unit cells in the array of unit cells.

5. The sample and hold system according to claim 1, wherein the controller is configured such that the acquisition order and/or the readout order are grouped into subgroups wherein the order in which subgroups are sampled or readout differs from trace to trace and/or wherein the order wherein the unit cells within a subgroup are readout or sampled differs from trace to trace.

6. The sample and hold system according to claim 5, wherein the unit cells are grouped into segments and wherein each subgroup of the acquisition order and/or of the readout order corresponds with a segment.

7. The sample and hold system according to claim 1, wherein the controller is configured such that the random assignment is based on a pseudo random binary sequence.

8. The sample and hold system according to claim 1, wherein the readout order is the same as the acquisition order.

9. The sample and hold system according to claim 1, the sample and hold system comprising a decoder wherein the decoder is configured for reordering the readout samples in the original sample order taking into account the acquisition order and the readout order.

10. The sample and hold system according to claim 1, wherein each unit cell comprises a capacitor and wherein the capacitors are configured for holding the samples.

11. The sample and hold system according to claim 1, wherein each unit cell comprises a magnetic element and wherein the magnetic elements are configured for holding the samples.

12. The sample and hold system according claim 1, wherein the array of unit cells is a two-dimensional array of unit cells.

13. An optical detector, the optical detector comprising:
    a sample and hold system for capturing and reading a sequence of time domain traces of an input signal; and
    at least one optical sensor,
    wherein the sample and hold system includes a readout device, a controller, and a sample and hold array of unit cells,
    wherein the controller is configured to control the sample and hold system
        such that during an acquisition phase a trace of samples is taken from the input signal in an original sample order and such that the samples are held in the unit cells wherein samples are assigned to different unit cells according to an acquisition order, and
        such that during a consecutive readout phase the samples are read out from the unit cells by the readout device wherein the order in which the unit cells are read out corresponds with a readout order,
    wherein the acquisition order and/or the readout order differs from trace to trace,
    wherein the sample and hold system is configured to average or accumulate corresponding samples of the sequence of traces, wherein a sample of a first trace corresponds with a sample of a further trace when both samples are at the same position in the original sample order, and
    wherein each optical sensor comprising an input for detecting an optical signal and an output for generating an output signal which is representative for the detected optical signal, wherein the output of the at least one optical sensor is the input signal of the sample and hold system.

14. A method for capturing and reading a sequence of traces of an input signal, the method comprising:
    capturing and reading out at least two traces of the input signal by at least two cycles of:
        an acquisition phase wherein samples are taken from the input signal and held in a unit cell of a sample and hold array of unit cells wherein the samples are assigned to the unit cells in an acquisition order,
        a readout phase wherein the samples in the unit cells are read out by a readout device wherein the order in which the unit cells are read out corresponds with a readout order,
    wherein the acquisition order and/or the readout order differs from trace to trace, and
    wherein the method further comprises averaging or accumulating corresponding samples of the sequence of traces, wherein a sample of a first trace corresponds with a sample of a further trace when both samples are at the same position in the original sample order.

* * * * *